(12) United States Patent
Romegialli et al.

(10) Patent No.: US 10,053,389 B2
(45) Date of Patent: *Aug. 21, 2018

(54) SETTING ACCELERATOR FOR A TILE ADHESIVE BLEND

(71) Applicant: YARA INTERNATIONAL ASA, Oslo (NO)

(72) Inventors: Gianluca Romegialli, Tortona (IT); Wolfram Franke, Porsgrunn (NO); Giuseppe Cilluffo, Garbagnate Milanese (IT)

(73) Assignee: Yara International ASA, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/564,857

(22) PCT Filed: Apr. 29, 2016

(86) PCT No.: PCT/EP2016/059585
§ 371 (c)(1),
(2) Date: Oct. 6, 2017

(87) PCT Pub. No.: WO2016/174190
PCT Pub. Date: Nov. 3, 2016

(65) Prior Publication Data
US 2018/0086668 A1    Mar. 29, 2018

(30) Foreign Application Priority Data

Apr. 30, 2015  (NO) .................................. 20150525

(51) Int. Cl.
| | | |
|---|---|---|
| *C04B 28/02* | (2006.01) |
| *C04B 22/08* | (2006.01) |
| *C04B 20/00* | (2006.01) |
| *C04B 20/02* | (2006.01) |
| *C04B 20/04* | (2006.01) |
| *C04B 40/06* | (2006.01) |
| *C04B 103/12* | (2006.01) |
| *C04B 111/00* | (2006.01) |

(52) U.S. Cl.
CPC .......... *C04B 22/085* (2013.01); *C04B 20/008* (2013.01); *C04B 20/026* (2013.01); *C04B 20/04* (2013.01); *C04B 28/02* (2013.01); *C04B 40/0608* (2013.01); *C04B 2103/12* (2013.01); *C04B 2111/00637* (2013.01)

(58) Field of Classification Search
CPC ..... C04B 22/085; C04B 28/02; C04B 20/008; C04B 20/026; C04B 20/04; C04B 40/0608; C04B 2103/12; C04B 2111/00637
See application file for complete search history.

(56) References Cited

U.S. PATENT DOCUMENTS

| | | | |
|---|---|---|---|
| 4,337,094 A | 6/1982 | Tokar | |
| 6,610,267 B1 | 8/2003 | Obrestad et al. | |
| 9,611,176 B2 * | 4/2017 | Franke | .................... C04B 28/02 |
| 2009/0189117 A1 | 7/2009 | Bewsey | |
| 2011/0034572 A1 | 2/2011 | Mueller | |

FOREIGN PATENT DOCUMENTS

| | | |
|---|---|---|
| DE | 10 2008 018802 A1 | 10/2009 |
| WO | 200002831 A1 | 1/2000 |
| WO | 2007012951 A1 | 2/2007 |
| WO | 2015067588 A1 | 5/2015 |

OTHER PUBLICATIONS

PCT International Search Report and Written Opinion dated Aug. 11, 2016 for PCT International Patent Application No. PCT/EP2016/059585, 11 pages.
PCT Notification Concerning Transmittal of International Preliminary Report on Patentability of the International Searching Authority, dated Aug. 2, 2017 in connection with PCT International Patent Application No. PCT/EP2016/059585, 19 pages.
Harald Justnes et al., "Technical calcium nitrate as set accelerator for cement at low temperatures," Cement and Concrete Research, vol. 25, No. 8, Dec. 1, 1995, pp. 1766-1774.

* cited by examiner

*Primary Examiner* — Anthony J Green
(74) *Attorney, Agent, or Firm* — Amster, Rothstein & Ebenstein LLP

(57) ABSTRACT

The application relates to the use of a powder comprising calcium nitrate as a setting accelerator for a tile adhesive blend, wherein nitrate powder comprising calcium nitrate, and optionally also comprising a nitrate salt different than the calcium nitrate, specifically potassium or ammonium nitrate, and having a particle size of between 0.01 mm and 1 mm is used as the setting accelerator. The application furthermore relates to a process for producing such a setting accelerator comprising, in one possible embodiment, the step of cutting or grinding prills and/or granules comprising the calcium nitrate and optionally the different nitrate salt, and in another embodiment, a spray drying process, resulting into the setting accelerator. The application also relates to a tile adhesive blend comprising at least a cement, sand and a such setting accelerator.

21 Claims, 1 Drawing Sheet

SETTING ACCELERATOR FOR A TILE ADHESIVE BLEND

CROSS-REFERENCE TO RELATED APPLICATIONS

This application is a U.S. national stage entry under 35 U.S.C. § 371 of PCT International Patent Application No. PCT/EP2016/059585, filed Apr. 29, 2016, which claims priority to Norwegian Patent Application No. 20150525, filed Apr. 30, 2015, the contents of which are incorporated herein by reference in their entirety.

FIELD OF THE APPLICATION

The application relates to the use of a powder comprising calcium nitrate as a setting accelerator for a tile adhesive blend. The application furthermore relates to a process for producing such a setting accelerator. The application also relates to a tile adhesive blend comprising such a setting accelerator.

BACKGROUND OF THE APPLICATION

A tile adhesive blend is mixed with water to make a workable paste which is useful as a tile adhesive to glue tiles to a surface. The adhesive becomes hard when it sets, resulting in a rigid aggregate structure.

Present-day, cement based tile adhesives are typically made from a mixture of an aggregate such as sand, a binder such as Portland cement, aluminate cement or lime, and water. Commonly, a tile adhesive blend consists of about 28 weight %-32 weight % of cement and of about 65 weight %-70 weight % of aggregate. The rest are admixtures and fibre chemicals. Just before use, the tile adhesive is mixed with water. The tile adhesive blend is stored dry in bags.

Cement is thus used as the binder material that hardens to form the connecting material between solids. Cements that are used in construction are either hydraulic or non-hydraulic. Hydraulic cements (e.g., Portland cement) harden because of hydration, being a chemical reaction between anhydrous cement powder and water. Consequently, they can harden underwater or when constantly exposed to wet weather. The chemical reaction results in hydrates that are not very water-soluble and so are quite durable in water. Non-hydraulic cements do not harden underwater. Slaked limes for example harden by reaction with atmospheric carbon dioxide. Portland cement is by far the most common type of cement in general use around the world. This cement is made by heating limestone (calcium carbonate) with small quantities of other materials (such as clay) to a temperature of 1450° C. in a kiln, in a process known as calcination. In a calcination process, a molecule of carbon dioxide is liberated from the calcium carbonate to form calcium oxide, also called quicklime, which is then blended with the other materials that have been included in the mix. The resulting hard substance, called 'clinker', is then ground with a small amount of gypsum into a powder to make 'Ordinary Portland Cement', the most commonly used type of cement (often referred to as OPC).

There exist different types of cement, within CEN region (Europe) indicated with CEM I to CEM V, with a lower or higher content of Portland cement CEM I: OPC with maximally 5% of other compounds;
CEM II: all kinds of mixtures of OPC and for instance slate, minimally 65% OPC;
CEM III: high oven/Portland cement mixture in 3 classes: A, B and C, wherein CEM III/A comprises the lowest (40%) and CEM III/C the highest (60%) amount of blast furnace slag;
CEM IV: types of Pozzolana cement;
CEM V: composite cements, with mixtures of OPC, blast furnace slag and Pozzolana compounds.

Another option is the classification according to ASTM standards, where mostly the ASTM type I and I/II class are high Portland cement content cements.

For tile adhesives, commonly only CEM I or ASTM type I is used, but due to its globally decreasing availability in favour of CEM II classes, there might be a change.

As tile adhesives are commonly used indoors, there is no strong dependency towards climate. However, a setting accelerator is often used in order to increase the performance of tile laying.

Until now, the most commonly used setting accelerator for tile adhesive blends is calcium formate ($Ca(HCOO)_2$). Calcium formate is a non-hygroscopic powder that shows good response with Ordinary Portland Cement (OPC). The disadvantage of calcium formate however is that it shows a weak response on the more and more popular blended cements like CEM II/A-V. In addition, calcium formate is quite an expensive calcium salt.

Calcium chloride ($CaCl_2$), which is the most cost efficient calcium salt, can also be used as a setting accelerator. However it can lead to efflorescence as crystalline deposits on surfaces. As tiles might be exposed to humidity, this efflorescence can happen at the gaps and reduce visual quality. In addition tile adhesives are often put directly on concrete (especially walls and floors) and thus chloride might migrate into the structure and cause corrosion. Also metal tubing is in contact with the tile adhesives and can cause corrosion.

Calcium nitrate ($Ca(NO_3)_2$) is commonly used as a concrete admixture, usually in the form of a solution. The final liquid product for end users is prepared from either a solution or a dissolved powder, granules or prills. The calcium nitrate is not present in the prior art dry concrete blends as a powder, but is added as an aqueous solution after the concrete blend has been mixed with water. Common types of calcium nitrate powder is not used in dry concrete blends since they tend to promote clogging/caking of the blend, both during storage and final mixing with water. Calcium nitrate shows a good response on most blended cement types. Usually 1% to 2% calcium nitrate needs to be added by weight of cement (=bwoc). Calcium Nitrate does not provoke any corrosion and is economically in favour of Calcium Formate.

Therefore, there exists the need to provide a tile adhesive blend containing calcium nitrate powder which does not clog or cake and in which the calcium nitrate does not precipitates when being mixed with water. A further need is to provide a tile adhesive which is odor free when being processed.

SUMMARY OF THE APPLICATION

According to a first aspect of the application, the use of a powder comprising calcium nitrate as a setting accelerator for a tile adhesive blend is provided, wherein at least 70 weight % of the powder has a particle size of between 0.01 mm and 1 mm, or between 0.1 mm to 1.0 mm.

A powder is a dry, bulk solid composed of a large number of very fine particles that may flow freely when shaken or tilted.

Specifically, the powder comprises at least 70 weight % calcium nitrate.

Accordingly, provided herein is the use of a powder comprising calcium nitrate as a setting accelerator for a tile adhesive blend wherein at least 70 weight % of the powder has a particle size of between 0.01 mm and 1 mm, specifically between 0.1 mm and 1.0 mm, and wherein the powder comprises at least 70 weight % calcium nitrate.

In some particular embodiments, the powder as disclosed herein comprises calcium nitrate as a setting accelerator for a tile adhesive blend wherein at least 75 weight % of the powder has a particle size of between 0.01 mm and 1 mm, specifically between 0.1 mm and 1.0 mm, and wherein the powder comprises at least 70 weight % calcium nitrate.

In some particular embodiments, the powder as disclosed herein comprises at least 75 weight % calcium nitrate. Accordingly, in some embodiments, provided herein is the use of a powder comprising at least 75 weight % calcium nitrate as a set accelerator for a tile adhesive blend, wherein at least 70 weight %, specifically at least 75 weight %, of the powder has a particle size of between 0.01 mm to 1 mm, specifically between 0.1 mm and 1.0 mm.

In an optional use according to the application, a powder comprising calcium nitrate and a nitrate salt different from calcium nitrate, specifically having a particle size of between 0.01 mm and 1 mm, more specifically between 0.1 mm and 1.0 mm, is used as the setting accelerator.

Specifically, the nitrate salt different than the calcium nitrate comprises potassium nitrate or ammonium nitrate.

Specifically, a powder comprising 75 weight % to 80 weight % of the calcium nitrate and 7 weight % to 11 weight % of the potassium nitrate or the ammonium nitrate and having a particle size of between 0.01 mm and 1 mm, specifically between 0.1 mm and 1.0 mm, is used as the setting accelerator.

The powder specifically has a water content between 0.1 weight % and 20 weight %.

In some embodiments, at least 80 weight %, at least 85 weight %, or at least 90 weight % of the powder has a particle size between 0.01 mm to 1 mm, specifically between 0.1 mm to 1.0 mm.

According to a further aspect of the application, a process is provided for producing a setting accelerator in the form of a powder, comprising calcium nitrate, for a tile adhesive blend, wherein the process comprises the step of cutting or grinding prills and/or granules comprising at least the calcium nitrate forming the setting accelerator having a particle size of between 0.01 mm and 1 mm, specifically between 0.1 mm to 1.0 mm. Specifically, the prills and/or granules comprises at least 70 weight % calcium nitrate.

Further provided is a process for producing a setting accelerator in the form of a powder, comprising calcium nitrate, for a tile adhesive blend, wherein the process comprises the step of cutting or grinding prills and/or granules comprising at least calcium nitrate to obtain the powder, wherein at least 70 weight % of the powder has a particle size of between 0.01 mm to 1 mm, specifically between 0.1 mm to 1.0 mm. Specifically, the prills and/or granules comprises at least 70 weight % calcium nitrate.

Further provided is a process for producing a setting accelerator in the form of a powder, comprising calcium nitrate, for a tile adhesive blend, wherein the process comprises the step of cutting or grinding prills and/or granules comprising at least calcium nitrate to obtain the powder, wherein at least 75 weight % of the powder has a particle size of between 0.01 mm to 1 mm, specifically between 0.1 mm to 1.0 mm. Specifically, the prills and/or granules comprises at least 70 weight % calcium nitrate.

In some embodiments, the prills and/or granules comprise at least a further nitrate salt different from calcium nitrate.

In a possible embodiment of a process according to the application, the process comprises the step of cutting or grinding prills and/or granules comprising the calcium nitrate and at least a nitrate salt different than the calcium nitrate forming the setting accelerator having a particle size of between 0.01 mm and 1 mm, specifically between 0.1 mm and 1.0 mm, and in particular wherein at least 70 weight %, specifically at least 75 weight %, of the powder has a particle size of between 0.01 mm to 1 mm, specifically between 0.1 mm to 1.0 mm.

In an embodiment of a process according to the application, the prills and/or granules are cut or grinded at a temperature between 10° C. and 40° C.

In a favorable embodiment of a process according to the application, the prills and/or granules are cut or grinded at a relative humidity of between 1% and 45%, more specifically between 1% and 40%.

When the prills and/or granules are cut to form the powder, specifically rotating blades are used. In this way, the prills and/or granules are only locally exposed to pressure. This has the advantage that it reduces heat release. Heat is bad for the powder, as it stimulates clogging.

In a process for producing a setting accelerator in the form of a powder, comprising calcium nitrate, for a tile adhesive blend, the process comprises the step of spray drying an aqueous solution comprising at least the calcium nitrate, at a temperature between 150° C. and 250° C., forming a setting accelerator having a particle size of between 0.01 mm and 1 mm, specifically between 0.1 mm to 1.0 mm, and in particular wherein at least 70 weight %, specifically at least 75 weight %, of the powder has a particle size of between 0.01 mm to 1 mm, specifically between 0.1 mm to 1.0 mm. Specifically, the aqueous solution comprises 50% by weight of calcium nitrate.

In a possible process according to the application, the process comprises the step of spray drying an aqueous solution comprising the calcium nitrate and a nitrate salt different than the calcium nitrate, at a temperature between 150° C. and 250° C., forming the setting accelerator having a particle size of between 0.01 mm and 1 mm, specifically between 0.1 mm to 1.0 mm, and in particular wherein at least 70 weight %, specifically at least 75 weight %, of the powder has a particle size of between 0.01 mm to 1 mm, specifically between 0.1 mm to 1.0 mm.

Accordingly, in some embodiments, the aqueous solution comprises a nitrate salt different from calcium nitrate, specifically potassium nitrate or ammonium nitrate.

The salt different from calcium nitrate specifically comprises potassium nitrate or ammonium nitrate.

In a particular embodiment, the process as disclosed herein provides that at least 80 weight %, at least 85 weight % or at least 90 weight % of the powder has a particle size of between 0.01 mm to 1 mm, specifically between 0.1 mm to 1.0 mm.

According to a last aspect of the application, a tile adhesive blend is provided comprising at least a binder, an aggregate and a setting accelerator in the form of a powder comprising calcium nitrate; the powder having a particle size of between 0.01 mm and 1 mm, specifically between 0.1 mm to 1.0 mm, and in particular wherein at least 70 weight %, specifically at least 75 weight %, of the powder has a particle size of between 0.01 mm to 1 mm, specifically between 0.1 mm to 1.0 mm. Specifically, the setting accelerator comprises at least 70 weight % calcium nitrate. Accordingly, in some particular embodiments, provided is a tile adhesive blend comprising at least a cement, an aggregate and a setting accelerator, wherein the setting accelerator is in the form of a powder comprising at least 70 weight % calcium nitrate, wherein at least 70 weight %, specifically at least 75 weight %, of the powder has a particle size of between 0.01 mm and 1 mm, specifically between 0.1 mm to 1.0 mm.

More specifically, the tile adhesive blend comprises a weight ratio of powder to cement of 0.005 to 0.1.

Specifically, the tile adhesive blend comprises a weight ratio of water to cement of 0.4 to 0.8.

Specifically, the tile adhesive blend comprises a weight ratio of aggregate to cement of between 2 and 4.

Accordingly, in some embodiments, provided herein is an adhesive blend comprising at least a cement, an aggregate and a setting accelerator, wherein the setting accelerator is in the form of a powder comprising at least 70 weight % calcium nitrate; wherein at least 70 weight %%, specifically at least 75 weight %, of the powder has a particle size of between 0.01 mm and 1 mm, specifically between 0.1 mm to 1.0 mm; and specifically wherein the tile adhesive blend has a weight ratio of setting accelerator to cement of 0.005 to 0.05, and/or a weight ratio of water to cement of 0.4 to 0.8, and/or a weight ratio of aggregate to cement of between 2 and 4.

All aspects of the application comprises an advantageous embodiment in which more than 70 weight %, more than 75 weight %, more 80 weight % or more 90 weight % of the powder has a particle size in the range of 0.01-1 mm or 0.1-1 mm.

All aspects of the application comprises a further advantageous embodiment in which the powder comprises more 70 weight %, 75 weight %, 80 weight % or 90 weight % of calcium nitrate.

DETAILED DESCRIPTION OF THE APPLICATION

Figure 1:
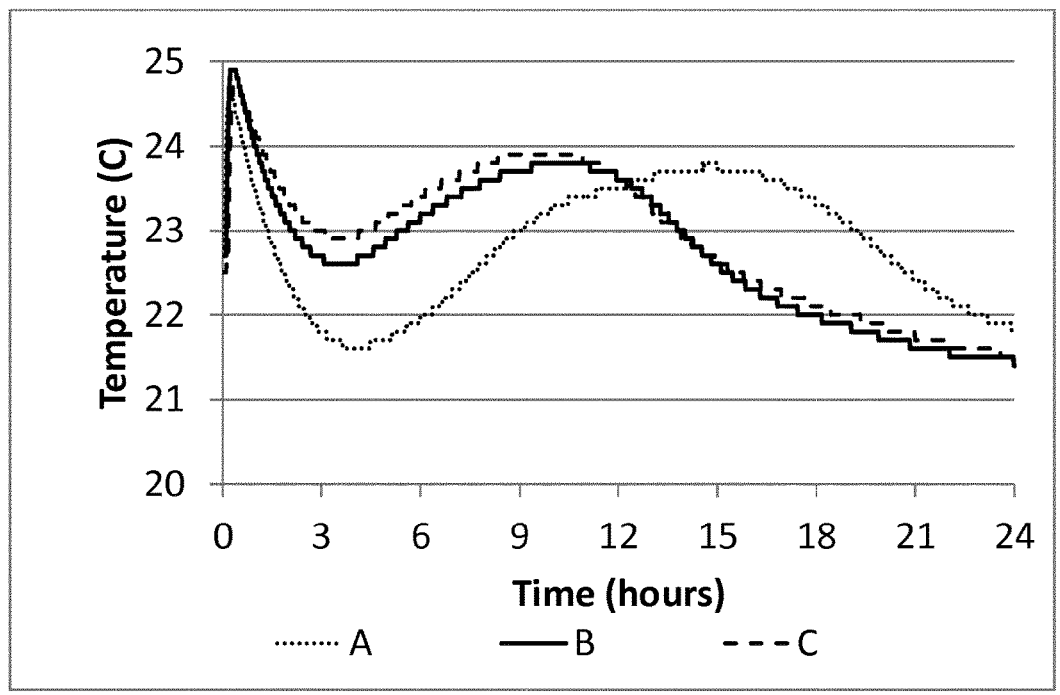
FIG. 1 shows a graph representing the hydration temperature (in ° C.) in function of the time (in hours) of the three samples as described in example 1.

The application relates to the use of a powder comprising calcium nitrate, specifically at least 70% by weight, as a setting accelerator for a tile adhesive blend. There exists also the possibility to include at least a nitrate salt that is different than the calcium nitrate in the setting accelerator. Specifically, this different nitrate salt comprises potassium nitrate or ammonium nitrate. The calcium nitrate salt different from calcium nitrate may be referred to as the other nitrate salt.

In some embodiments, the concentrations of calcium nitrate and the other nitrate salt add up to 100 weight %. Accordingly, in some embodiments, the setting accelerator comprises x weight % calcium nitrate, and y weight % potassium nitrate, the sum of x and y being 100. In some embodiments, the setting accelerator comprises x weight % calcium nitrate, and z weight % ammonium nitrate, the sum of x and z being 100. In some embodiments, the setting accelerator comprises x weight % calcium nitrate, y weight % potassium nitrate, and z weight % ammonium nitrate, the sum of x, y, and z being 100.

In some embodiments, the concentrations of calcium nitrate, the other nitrate salt and water add up to 100 weight %. Accordingly, in some embodiments, the setting accelerator comprises w weight % water, x weight % calcium nitrate, and y weight % potassium nitrate, the sum of w, x and y being 100. In some embodiments, the setting accelerator comprises w weight % water, x weight % calcium nitrate, and z weight % ammonium nitrate, the sum of w, x and z being 100. In some embodiments, the setting accelerator comprises w weight % water, x weight % calcium nitrate, y weight % potassium nitrate, and z weight % ammonium nitrate, the sum of w, x, y, and z being 100.

In case the setting accelerator only consists of calcium nitrate, then the powder can be formed out of the processing of prills and/or granules consisting out of calcium nitrate.

In case the powder also comprises a nitrate salt different than the calcium nitrate, specifically potassium or ammonium nitrate, then the powder can be formed out of the processing of prills and/or granules consisting of a salt complex of the calcium nitrate and the ammonium nitrate or potassium nitrate. The salt complex specifically comprises 75 weight % to 80 weight % of calcium nitrate and 7 weight % to 11 weight % of potassium nitrate or ammonium nitrate. An example of a salt complex of calcium nitrate and potassium nitrate is described in WO 00/02831 in the name of Norsk Hydro ASA. Therein, a method is disclosed for manufacturing a homogeneous and ammonium free calcium nitrate melt with high solidification temperature suitable for conventional particulation methods. The method comprises the steps of mixing a potassium source with a calcium nitrate source, and then heating the formed mixture to 150-155° C. to form a melt comprising 1.5-5.5 weight % of K (as $KNO_3$), 13-18 weight % of water and 70-80 weight % of $Ca(NO_3)_2$. This salt complex is not very hygroscopic.

The processing of the prills and/or granules to form a powder can consist in cutting the abovementioned prills and/or granules. Specifically, rotating blades are used to cut the prills and/or granules. Another possibility to form the powder out of the abovementioned prills and/or granules is to grind these.

The cutting or grinding of the prills and/or granules is specifically performed at a temperature between 10° C. and 40° C., and specifically at a relative humidity of between 1% and 45%, more specifically between 1% and 40%.

Another possible option to form the powder is to spray dry an aqueous solution comprising calcium nitrate, and optionally also comprising another nitrate salt (different from calcium nitrate), specifically ammonium nitrate or potassium nitrate. The spray drying of the aqueous solution is specifically performed at a temperature between 150° C. and 250° C. The aqueous solution is injected via a nozzle into a hot air stream with a temperature of between 150° C. and 150° C. This aqueous solution specifically comprises 50% by weight of calcium nitrate.

The resulting powder out of the three abovementioned processes specifically has a particle size of 0.01 mm to 1 mm, or 0.1 mm to 1 mm, and a water content of between 0.1 weight % and 20 weight %.

In order to obtain a tile adhesive blend, the powder according to the application as described above is first of all blended with a binder, specifically cement. About 0.5% to 2% by weight of cement of the powder according to the application is added.

Furthermore, an aggregate, specifically sand, is added. This tile adhesive blend can be stored in bags for several weeks.

It is observed that the produced tile adhesive blend comprising the powder according to the application (comprising calcium nitrate and at least another nitrate salt different than the calcium nitrate, specifically potassium nitrate or ammonium nitrate) as a setting accelerator shows the same performance as the conventional mortars to which a calcium nitrate solution (solely comprising calcium nitrate) has been added as a setting accelerator while mixing.

EXAMPLES

Example 1

Three samples of tile adhesive blend were produced, i.e.
an untreated sample (A) consisting of an untreated tile adhesive blend consisting of sand and cement. No setting accelerator is added.
a conventional sample (B) consisting of a tile adhesive blend consisting of sand, cement, and 2% by weight of cement of calcium nitrate as a setting accelerator which is added as a solution after the cement and sand have been mixed with water.
a sample of a tile adhesive blend according to the application (C) consisting of sand, cement, and 2% by weight of cement calcium nitrate powder according to the application which is added as a setting accelerator before being mixed with water.

Each of the three samples (being dry mixes of tile adhesive blend) was mixed with water to obtain a tile adhesive paste.

The hydration of the abovementioned samples (A-C) was measured via the temperature development while the hydration took place. To measure the hydration temperature, a PT-100 type sensor, which is a commonly used temperature sensor, was used. For logging the temperature data, an E+H (Endress+Hauser) Memograph M, i.e. a device that specifically has been designed to save a variety of diverging process parameters, was used.

The powder according to the application was produced out of Yara NitCal® K granules, being a technical grade nitric acid, calcium potassium salt. The chemical composition of this complex salt is $KNO_3:Ca(NO_3)_2:H_2$ in a ratio of 1:5:10. The Yara NitCal® K granules were crushed in a lab scale crusher based on a rotating knives principle. The resulting powder was sieved to obtain a particle size of approximately 0.01 to 0.1 mm, see below for more details regarding the sieving procedure.

The tile adhesive blend was prepared using cement as the binder and standard sand as the aggregate. The applied weight ratio of water/cement was 0.5 and the applied weight ratio of sand to cement was 3.

The sample size was 500 ml each. The samples of the tile adhesive blend according to the application were stored on benches at a temperature of circa 20° C. for up to 2 months.

The performance tests were evaluated after several weeks. In FIG. 1, the results of the hydration temperature in function of the time in hours for a 2 weeks shelf storage time are given as an example. When looking at this graph as shown in FIG. 1, it is observed that the sample according to the application (C) leads to similar or even improved results compared to the conventional sample (B). Both samples (B & C) show an earlier setting compared to the untreated sample (A); in other words the hydration performance of both samples (B & C) is higher than the one of the untreated sample (A).

Example 2

In a laboratory mixer, Yara NitCal® K granules were cut. The sample was then segregated by particle size. In particle segregation, particulate solids tend to segregate by virtue of differences in the size, and also physical properties such as volume, density, shape and other properties of particles of which they are composed. In the present examples the particles of the sample obtained from the cut granules were segregated in a sieve shaker using a stack of woven wire mesh sieves having mesh sizes of 2 mm, 1 mm, 0.5 mm, and 0.1 mm, respectively. The following classes were formed:
>2 mm;
1-2 mm;
0.5-1 mm;
0.1-0.5 mm;
<0.1 mm.

Figure 2:
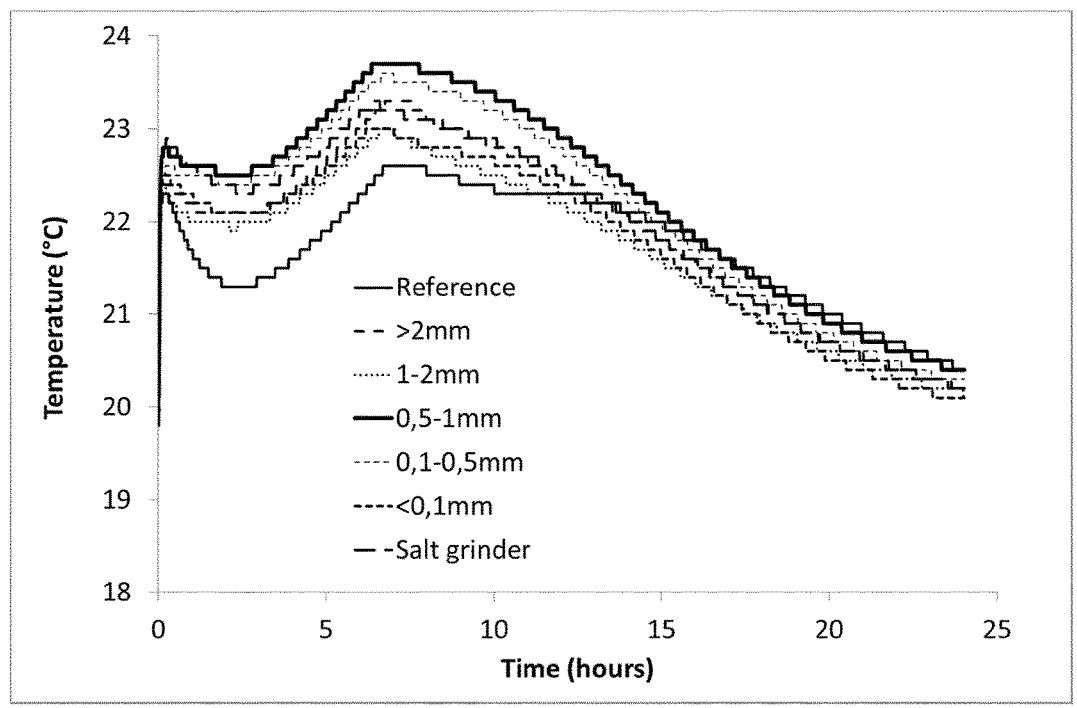
FIG. 2 shows a graph representing the hydration temperature (in ° C.) in function of the time (in hours) of samples having a different sized material.

CEM II/A-V 42.5 was used as cement. Tile adhesive blend samples of 500 ml size and with a ratio water/cement of 0.65 were prepared. 1.5% by weight of cement of the powder according to the application was added. The curing temperature was 5° C. and 20° C. As can be seen in FIG. 2, the tests indicated that the powder according to the application with a particle size of 0.01 mm to 1 mm performed best, while powders having a larger or smaller particle size do not perform as well. In addition, the tile adhesive blend comprising a powder having a particle size of less than 0.1 mm, in which powder at least 70 weight % of the particles are of a particle size in the range of 0.01 mm to 0.1 mm, also showed an advantageous performance.

As shown by examples 1 and 2, the setting accelerator according to the application may be mixed with an aggregate, a binder and other possible compounds to form a tile adhesive blend. When this tile adhesive blend is mixed with water, no caking or clogging is obtained since the powder particles are of just the right size for dissolving in the remaining water. Large size particles (particle size of more 1.0 mm) do not dissolve properly due to lack of locally free water in the blend/water-mixture, while very small particles (particle size less 0.01 mm) tend to form not easily dissolvable agglomerates with the locally free water. Thus, both particle sizes above 1 mm and below 0.01 mm provide an inferior setting accelerator effect compared to the particle size range of 0.01 mm to 1.0 mm or 0.1 mm to 1.0 mm.

Furthermore, by using a setting accelerator according to the application no odor is released during mixing of the tile adhesive blend, since no ammonia containing components are used.

The invention claimed is:
1. Process for preparing a tile adhesive blend comprising blending a binder, and aggregate and a setting accelerator, wherein said setting accelerator is a powder comprising calcium nitrate, wherein at least 70 weight % of the powder has a particle size of between 0.01 mm to 1 mm, and wherein the powder comprises at least 70 weight % calcium nitrate.

2. Process according to claim 1, wherein the powder comprises a further nitrate salt different from calcium nitrate.

3. Process according to claim 1, wherein the powder comprises 75 weight % to 80 weight % of calcium nitrate and 7 weight % to 11 weight % of potassium nitrate or ammonium nitrate.

4. Process according to claim 1, wherein the powder has a water content between 0.1 weight % and 20 weight %.

5. Process according to claim 1, wherein at least 80 weight % of the powder has a particle size of between 0.01 mm to 1 mm.

6. Process for obtaining a tile adhesive blend according to claim 1 further comprising the step of preparing an accelerator in the form of a powder comprising at least 70 weight % calcium nitrate, wherein at least 70 weight % of the powder has a particle size of between 0.01 mm and 1 mm, the step comprising cutting or grinding prills and/or granules comprising at least calcium nitrate.

7. Process for obtaining a tile adhesive blend according to claim 1 further comprising the step of preparing an accelerator in the form of a powder, said powder comprising at least 70 weight % calcium nitrate, wherein at least 70 weight % of the powder has a particle size of between 0.01 mm and 1 mm, the step comprising spray drying an aqueous solution comprising calcium nitrate, at a temperature between 150° C. and 250° C.

8. The process according to claim 1, wherein at least 70 weight % of the powder has a particle size between 0.1 mm to 1.0 mm.

9. The process according to claim 2 wherein the further nitrate salt is potassium nitrate or ammonium nitrate.

10. Process for producing a setting accelerator in the form of a powder, comprising calcium nitrate, for a tile adhesive blend, CHARACTERISED IN THAT the process comprises the step of cutting or grinding prills and/or granules comprising at least calcium nitrate to obtain the powder, wherein at least 70 weight % of the powder has a particle size of between 0.01 mm to 1 mm.

11. Process according to claim 10, wherein the prills and/or granules comprise at least a further nitrate salt different from calcium nitrate.

12. Process according to claim 10, wherein the prills and/or granules are cut or grinded at a temperature between 10° C. and 40° C.

13. Process according to claim 10, wherein the prills and/or granules are cut or grinded at a relative humidity of between 1% and 45%.

14. Process according to claim 10, wherein at least 80 weight % of the powder has a particle size of between 0.01 mm to 1 mm.

15. Process for producing a setting accelerator in the form of a powder, comprising calcium nitrate, for a tile adhesive blend, wherein at least 70 weight % of the powder has a particle size of between 0.01 mm and 1 mm, characterised in that the process comprises the step of spray drying an aqueous solution comprising calcium nitrate, at a temperature between 150° C. and 250° C.

16. Process according to claim 15, wherein the aqueous solution comprises 50 weight % of calcium nitrate.

17. Process according to claim 15, wherein the aqueous solution comprises a nitrate salt different from calcium nitrate.

18. Process according to claim 15, wherein at least 80 weight % of the powder has a particle size of between 0.01 mm to 1 mm.

19. Tile adhesive blend comprising at least a cement, an aggregate and a setting accelerator, CHARACTERISED IN THAT the setting accelerator is in the form of a powder comprising at least 70 weight % calcium nitrate, wherein at least 70 weight % of the powder has a particle size of between 0.01 mm and 1 mm, and optionally wherein the tile adhesive blend has a weight ratio of setting accelerator to cement of 0.005 to 0.05, and/or a weight ratio of aggregate to cement of between 2 and 4.

20. Tile adhesive blend according to claim 19, wherein at least 80 weight % of the powder has a particle size of between 0.01 mm to 1 mm.

21. Tile adhesive paste comprising a tile adhesive blend according to claim 19 and water, wherein the weight ratio of water to cement ranges from 0.4 to 0.8.

* * * * *